(12) United States Patent
Nieminen et al.

(10) Patent No.: US 11,080,470 B2
(45) Date of Patent: Aug. 3, 2021

(54) FINE-TUNING AUTOMATICALLY LABEL LOCATIONS IN ENGINEERING DRAWINGS

(71) Applicant: Trimble Solutions Corporation, Espoo (FI)

(72) Inventors: Lassi Nieminen, Espoo (FI); Henri Pitkänen, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 90 days.

(21) Appl. No.: 16/241,773

(22) Filed: Jan. 7, 2019

(65) Prior Publication Data

US 2019/0220506 A1     Jul. 18, 2019

(30) Foreign Application Priority Data

Jan. 15, 2018   (FI) ................................... 20185040

(51) Int. Cl.
| | | |
|---|---|---|
| *G06F 30/20* | (2020.01) | |
| *G06F 40/169* | (2020.01) | |
| *G06T 11/60* | (2006.01) | |
| *G06F 111/12* | (2020.01) | |

(52) U.S. Cl.
CPC ............ *G06F 40/169* (2020.01); *G06F 30/20* (2020.01); *G06T 11/60* (2013.01); *G06F 2111/12* (2020.01)

(58) Field of Classification Search
CPC .... G06F 40/169; G06F 30/20; G06F 2111/12; G06T 11/60
USPC ................................................ 715/230, 234
See application file for complete search history.

(56) References Cited

U.S. PATENT DOCUMENTS

| | | | | |
|---|---|---|---|---|
| 6,346,943 | B1* | 2/2002 | Thoemmes | G05B 19/00 345/443 |
| 7,131,060 | B1* | 10/2006 | Azuma | G06T 11/60 715/260 |
| 2006/0200759 | A1* | 9/2006 | Agrawala | G06F 40/103 715/209 |
| 2011/0063328 | A1* | 3/2011 | Herman | G06T 19/00 345/681 |
| 2013/0097489 | A1 | 4/2013 | Linder et al. | |
| 2014/0085297 | A1 | 3/2014 | Kraemer et al. | |
| 2017/0262418 | A1* | 9/2017 | Lopez | G06T 11/60 |

OTHER PUBLICATIONS

Finnish Search Report for Application No. 20185040, dated Jun. 4, 2018, 3 pages.

* cited by examiner

*Primary Examiner* — Hope C Sheffield

(74) *Attorney, Agent, or Firm* — Kilpatrick Townsend & Stockton LLP

(57) ABSTRACT

A solution that automatically fine-tunes label locations in an engineering drawing is disclosed. The label locations are fine-tuned by performing a line-line solving process, a frame-frame solving process and a frame-line solving process according to a first order of the processes, and repeating performing the processes according to the first order as long as during performing the processes one or more frames have been moved to another location and a first repeat criterion is met. Each solving process repeats determining label pairs, and solving the problem in question for the labels in the pair as long as problematic label pairs can be determined and process-specific repeat criterion is met.

18 Claims, 9 Drawing Sheets

FINE-TUNING AUTOMATICALLY LABEL LOCATIONS IN ENGINEERING DRAWINGS

RELATED APPLICATIONS

This application claims priority to Finnish patent application no. 20185040, filed on Jan. 15, 2018, the contents of which is hereby incorporated herein by reference in its entirety.

FIELD

The invention relates GENERALLY TO LABELS IN AN ENGINEERING DRAWING, AND ESPECIALLY TO FINE-TUNING AUTOMATICALLY LABEL LOCATIONS.

BACKGROUND ART

The development of data processing systems, computer and computer applications has transformed different processes into computerized processes. For example, engineering drawings are created and manipulated by use of computer applications. Labels in an engineering drawing are usually placed automatically by a computer application processing the engineering drawing. Often at least some of the automatically placed labels overlap each other even though placing them a little bit differently would cause that less labels are overlapping. Overlapping labels increase a risk of misunderstanding, which in turn may increase or cause loss of products or decrease productivity, for example.

SUMMARY

The invention relates to a method, a program product, and an apparatus which are characterized by what is stated in the independent claims. The preferred embodiments are disclosed in the dependent claims.

An aspect introduces a solution to automatically fine-tune label locations in an engineering drawing so that the number of overlapping or touching labels is reduced.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any computer-aided modeling system, and corresponding modeling applications (i.e. modeling programs), or any other sys-tem/applications configured or configurable to create and/or to manipulate engineering drawings comprising labels. Examples of such applications are computer aided design applications and computer aided modeling applications, such as different Building Information Modeling (BIM) applications. Current BIM applications are used to plan, design, construct, operate and maintain diverse physical infrastructures, such as water, refuse, electricity, gas, communication utilities, roads, bridges, ports, tunnels, different buildings, etc.

Various programming techniques, storage of data in memory and manners of modeling real world articles and implementing databases develop constantly. This may require extra changes in the invention. Consequently, all terms and expressions should be interpreted broadly, and they are intended to describe, not to restrict, the invention.

Engineering drawings are two or three dimensional drawings that communicate the requirements for the manufacture, including maintenance and repairing, of an end-product, an assembly of end-products and different installations in the end-product. Such engineering drawings are often used to aid in the creation, simulation, planning, construction, maintenance, manufacturing, or other aspect of technical interaction with a product or structure. A structure includes, for example, and not limitation, a building, bridge, tunnel, monument, dam, or landmass.

Figure 1A:
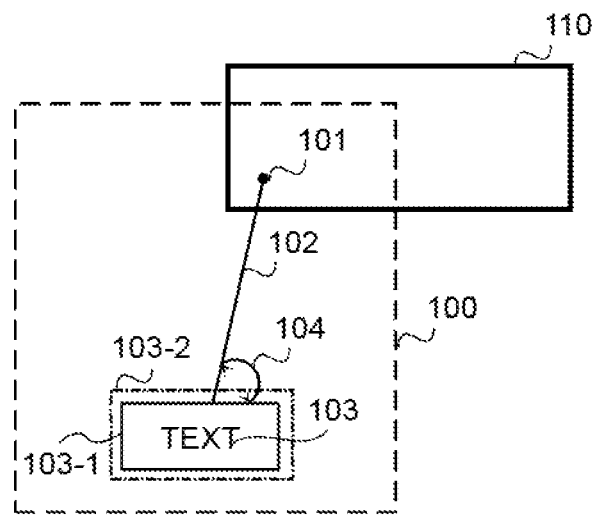
FIG. 1A shows an example of a label.
Figure 1B:
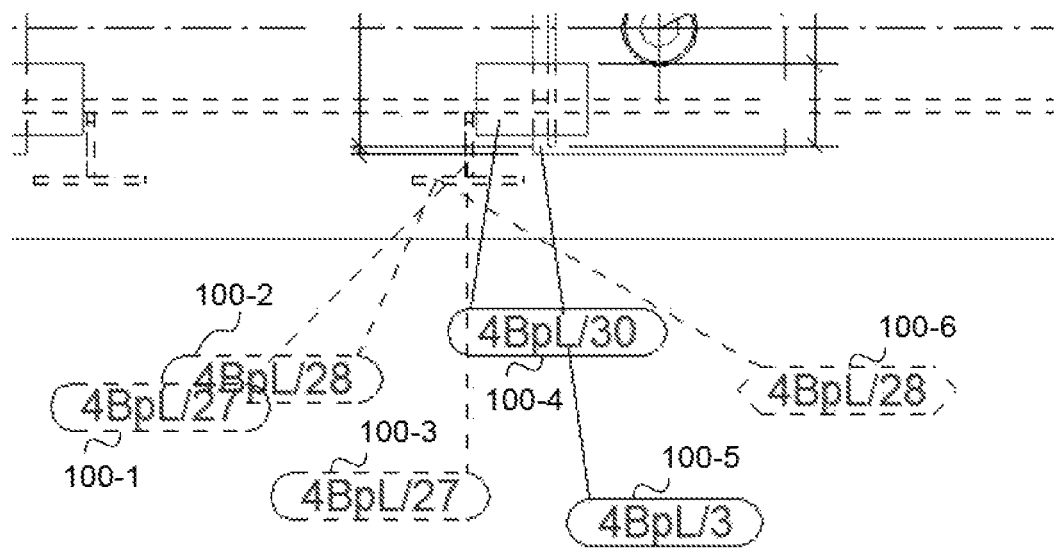
FIG. 1B shows examples of problematic situations.

Engineering drawings include labels to provide information on illustrated components in the engineering drawings. FIGS. 1A and 1B illustrate basic concepts of labels in engineering drawings. A label, which is also called a mark, is in an engineering drawing an annotation object that is used for identification of an individual object, or more precisely, a real-world article represented by the object, and that displays a set of property elements. The set of property elements may be selected by a user. A non-limiting list of examples of information that may be displayed in a label/outputted via label includes identifying information on a construction, information about welding, information about an assembly to a workshop, information about how parts should be connected to each other, information which parts should be connected to each other, dimensions of a part (or component), and an annotation from an engineer indicating that a specific material should be used to produce the part (or component). The labels might also include audio, video, or image files that portray or provide additional information to the drawing. Since the labels are used to convey information especially on details, it is very important that the relation between the object and its label is easily seen and as clear as possible, especially if the drawings are machine-read, to minimize manufacturing and/or maintenance errors in different phases.

Referring to FIG. 1A, a label 100 comprises an originating point 101, a frame 103 and a line 102, between the originating point and the frame 104, the line having an angle 104 to the frame. The frame 103 is for conveying information, illustrated by a character string "text" in FIG. 1A, on a component/structure/detail/part etc. represented by an object 110 in the engineering drawing. It should be appreciated that it bears no significance to the invention what the content in the label is and which type of real-world article/component the object 110 represents. Typically the application with which the engineering drawing is manipulated determines the location of the originating point 101 and whereto the frame 103 the line 102 ends.

The frame 103 may have a visible borderline 103-1 with any possible shape. However, in any case the frame 103 has an outline 103-2 which may be the same as the visible borderline 103-1, or have on offset, as in the illustrated example, compared to the visible borderline. Further, the outline 103-2 may have a different shape than the borderline 103-1. For example, the borderline may be an ellipse or a parallelogram, but the outline 103-2 may be a rectangle.

Usually the applications create labels automatically. This may result to situations illustrated in FIG. 1B, i.e. to a plurality of situations in which two or more labels are touching each other. By touching is meant that at least parts of the two or more labels overlap/cross and/or are so near each other that no separation is possible. For example, labels may have overlapping/touching frames, as shown by labels 100-1 and 100-2 in FIG. 1B. Such a situation is called below frame-frame situation, and synonyms include frame-to-frame situation and frame-over-frame situation. A label may have a frame that overlaps (crosses) a line of another label. It may be expressed also in another order, i.e. a line of a label may touch/overlap one or more frames of one or more other labels. In the example illustrated in FIG. 1B, a frame of a label 100-4 overlaps lines of labels 100-3 and 100-5, and if an outline of a label 100-4 has an offset to a borderline of the frame, it may overlap a line of a label 100-6. Such a situation is called below frame-line situation, and synonyms include frame-to-line situation, frame-over-line situation, line-frame situation, line-to-frame situation and line-over-frame situation. Still another problematic situation is if lines of labels are crossing. For example, the line of label 100-6 is crossing lines of the labels 100-5, 100-4, 100-3 and 100-1. Such a situation is called below line-line situation, and synonyms include line-to-line situation and line-over-line situation.

Figure 2:
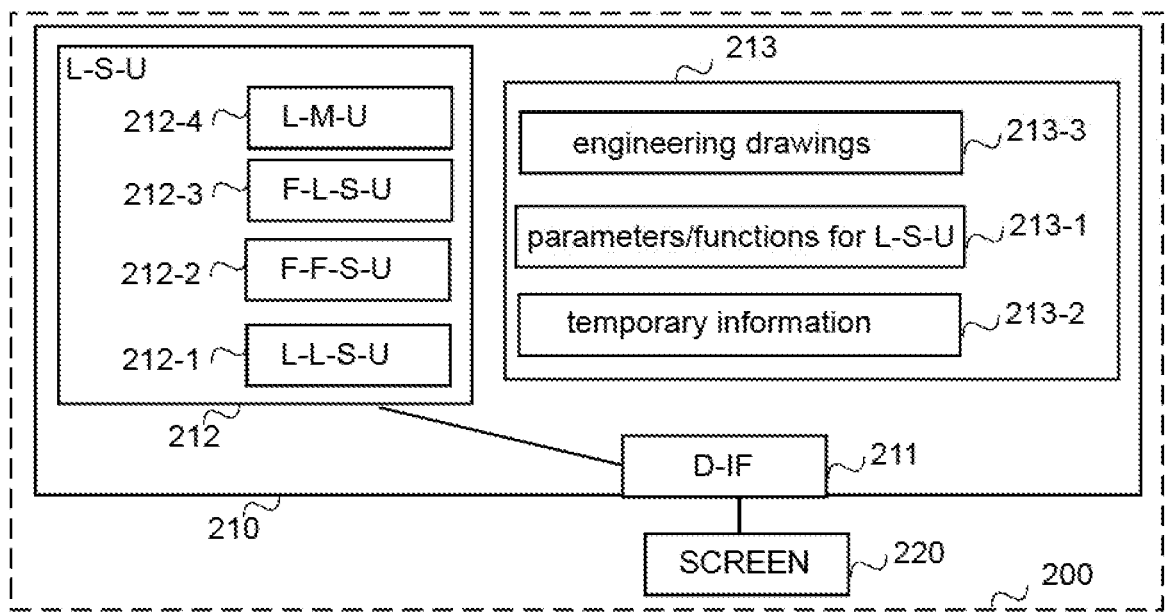
FIG. 2 shows a simplified architecture of an exemplary system and a schematic block diagrams of some apparatuses.

FIG. 2 illustrates a simplified system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The modeling system 200 illustrated in FIG. 2 is a simplified modeling system that comprises one or more apparatuses 210 (only one shown in FIG. 2) with one or more memories 213 (only one shown in FIG. 2) or data storages that may be external data storage to an apparatus or an internal data storage, as in FIG. 2, or partly external and partly internal.

The apparatus 210 may be any computing device that can be configured to perform at least part of functionalities described below to fine-tune label locations (positions) in engineering drawings. For that purpose the apparatus 210 comprises one or more user interfaces 211, a label location solving unit (L-S-U) 212, and in the memory 213 different parameters and/or functions 213-1 for the label location solving unit, and memory area 213-2 to maintain different information temporarily when the label location solving unit, or any corresponding unit or sub-unit, is run to fine-tune label locations in an engineering drawing.

In the illustrated example, the label location solving unit (L-S-U) 212 comprises four sub-units whose functionality the label location solving unit is configured to control. The four sub-units are a line-line solving unit (L-L-S-U) 212-1 for solving situations in which two or more lines are crossing (touching), a frame-frame solving unit (F-F-S-U) 212-2 for solving situations in which two or more frames are overlapping (touching), a frame-line-solving unit (F-L-S-U) 212-3 for solving situations in which a frame over-laps/touches one or more lines, or vice versa, and a line length minimizing unit (L-M-U) 213-4 for shortening lines, if possible. In another example, there is no line length minimizing unit. In still further examples, some of the sub-unit may have been integrated together, or there is no sub-units at all.

Examples of parameters and/or functions 213-1 for the label location solving unit are described below in detail. There may be different parameters/functions for each of the sub-units and still different parameters/functions for controlling the sub-units. In the illustrated example, the memory 213 comprises also one or more engineering drawings 213-3 with corresponding definitions.

The apparatus 210 can be further configured to create and/or modify and/or edit and/or change and/or view and/or output other information relating to engineering drawings, or corresponding one or more models. Examples of such apparatuses include a user terminal or a work station, such as a laptop, a smartphone, a personal computer, a tablet computer, a field device, a virtual reality device, augmented reality (AR) interface device, a web client, or a server, like a cloud server or a grid server.

A user interface 211 is the interface of a user to the modeling system. The user can create a model, modify a model, study it, output desired drawings, such as the engineering drawings, and/or reports of the model, view the model, input information, including different selections, relating to the fine-tuning of label locations, etc. by using the one or more user interfaces 211. For example, one of the interfaces 211 may be a display interface (D-IF) via which an engineering drawing may be shown on a display screen 220.

The modeling system 200 illustrated in FIG. 2 represents the simplest modeling system. In larger modeling systems, the apparatus 210 may be a terminal and the data storage a database with which the terminal communicates via a server. In such a system, the server may be configured to perform one or more of label location solving unit 212 functionalities. The data storage 213 may be any kind of conventional or future data repository, including distributed and centralized storing of data, managed by any suitable management system forming part of the modeling system (modeling environment). An example of distributed storing includes a cloud-based storage in a cloud environment (which may be a public cloud, a community cloud, a private cloud, or a hybrid cloud, for example). Cloud storage services may be accessed through a co-located cloud computer service, a web service application programming interface (API) or by applications that utilize API, such as cloud desktop storage, a cloud storage gateway or Web-based content management systems. However, the implementation of the data storage, the manner how data is stored, retrieved and updated, and the location where the label location solving unit, or any of its sub-units, and/or fine-tuning of label locations, or part(s) of the fine-tuning, is(are) performed are irrelevant to the invention. Further, the modeling system may comprise several terminals and servers with databases, which are preferably integrated to be visible to the user as one database and one database server.

In below examples, a repeat criterion is used for the sake of clarity. Naturally repeat criteria can be used instead. Implementing examples with repeat criteria is a straightforward process to one skilled in the art.

Figure 3:
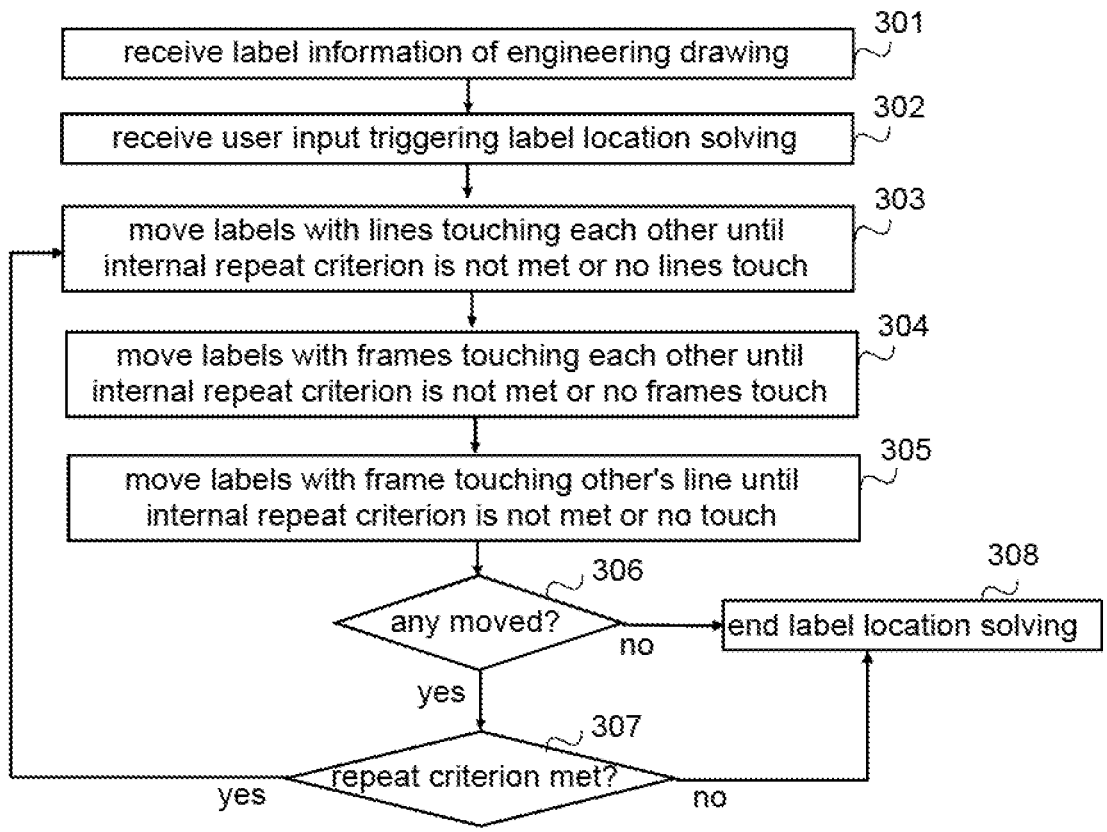
FIGS. 3 to 12 illustrate different exemplary functionalities.

FIG. 3 is a flow chart illustrating an example of a functionality of an apparatus, or more precisely a label location solving unit, according to an implementation in which no line length shortening (minimization) is implemented. Further, in the example it is assumed that a predetermined processing order and a predetermined movement direction is used. The predetermined movement direction may be vertical, horizontal or combined, or determined amongst the three by calculating which ones gives the shortest movement. Further, the movement direction may be predetermined separately for each situation in which movement direction is used.

Referring to FIG. 3, the apparatus is running an application in which an engineering drawing will be displayed to a user. When the engineering drawing is retrieved, also label information of the engineering drawing is received in step 301. The label information comprises information on labels, i.e. their original points, frame locations, outlines of frames and lines between original points and corresponding frames.

In the illustrated example a user input triggering the label location solving is received in step 302. The label location solving may be performed to the whole engineering drawing, or only to labels selected by the user, either one by one, or by selecting an area.

In the illustrated example of FIG. 3, the label location solving is performed in a predetermined order of sub-processes: first line-line situations are processed, then the frame-frame situations and the frame-line situations as the last in the order.

Therefore labels having lines touching each other are moved in step 303 by relocating frames, and thereby also the lines between original points and frames to frames' new locations, so that they are not any more touching. The relocating is preferably performed by forming label pairs, and changing places of their frames, as will be described in more detail below. The relocating will be continued as long as there are lines touching each other and the repeat criterion for line-line solving is met.

Then labels having frames touching each other are moved in step 304 by relocating frames according to the predetermined movement direction, and thereby also the lines between original points and the frames to frames' new locations, so that they are not any more touching. The relocating is preferably performed by forming label pairs, and changing place of one of the frames to a place where the frames in the pair are not any more touching each other, as will be described in more detail below. Alter-native to changing places includes moving labels or one of them according to the predetermined movement direction. The relocating will be continued as long as there are frames touching each other and the repeat criterion for frame-frame solving is met.

Then labels having frames touching lines of other labels are moved in step 305 by relocating frames according to the predetermined movement direction, and thereby also the lines between original points and frames to frames' new locations, so that frames are not any more touching lines. The relocating is preferably performed by forming label pairs, and changing place of the frame, as will be described in more detail below. The relocating will be continued as long as there are frames touching lines of other labels and the repeat criterion for frame-line solving is met.

Once the sub-processes have been performed, it is checked in step 306, whether any label was moved when the sub-processes were performed. Since in the sub-processes each movement solves the problem within the pair but no check is made, whether the movement causes a problem with one or more other labels, this check ensures that the problems will be processed.

If one or more labels were moved (step 306: yes), it is checked in step 307 whether a repeat criterion for label location solving is met. By performing this checking it is ensured that the process ends at some point even though there may be labels with lines touching each other, and/or frames touching frames and/or frames touching lines of other labels. This also ensures that the frames of the label will remain closer to the object (part) which they relate to compared, for example, to a situation in which the target result is that no label overlap with another. If the repeat criterion is met (step 307: yes), the process returns to step 303 and the sub-processes are repeated in the same order they were repeated previously.

If no label was moved (step 306: no), or if the repeat criterion is not met (step 307: no), the label location solving is ended in step 308 and the locations of labels are stored to the engineering drawing.

The repeat criterion for label location solving is preferably such that the process is performed, if any label has been moved, at least twice. For example, if a number value is used as a criterion, the internal repeat criterion may be hundreds or thousands, each (sub-)process having a different value, or same values may be used, whereas the repeat criterion for label location solving may be dozens or less.

Figure 4:
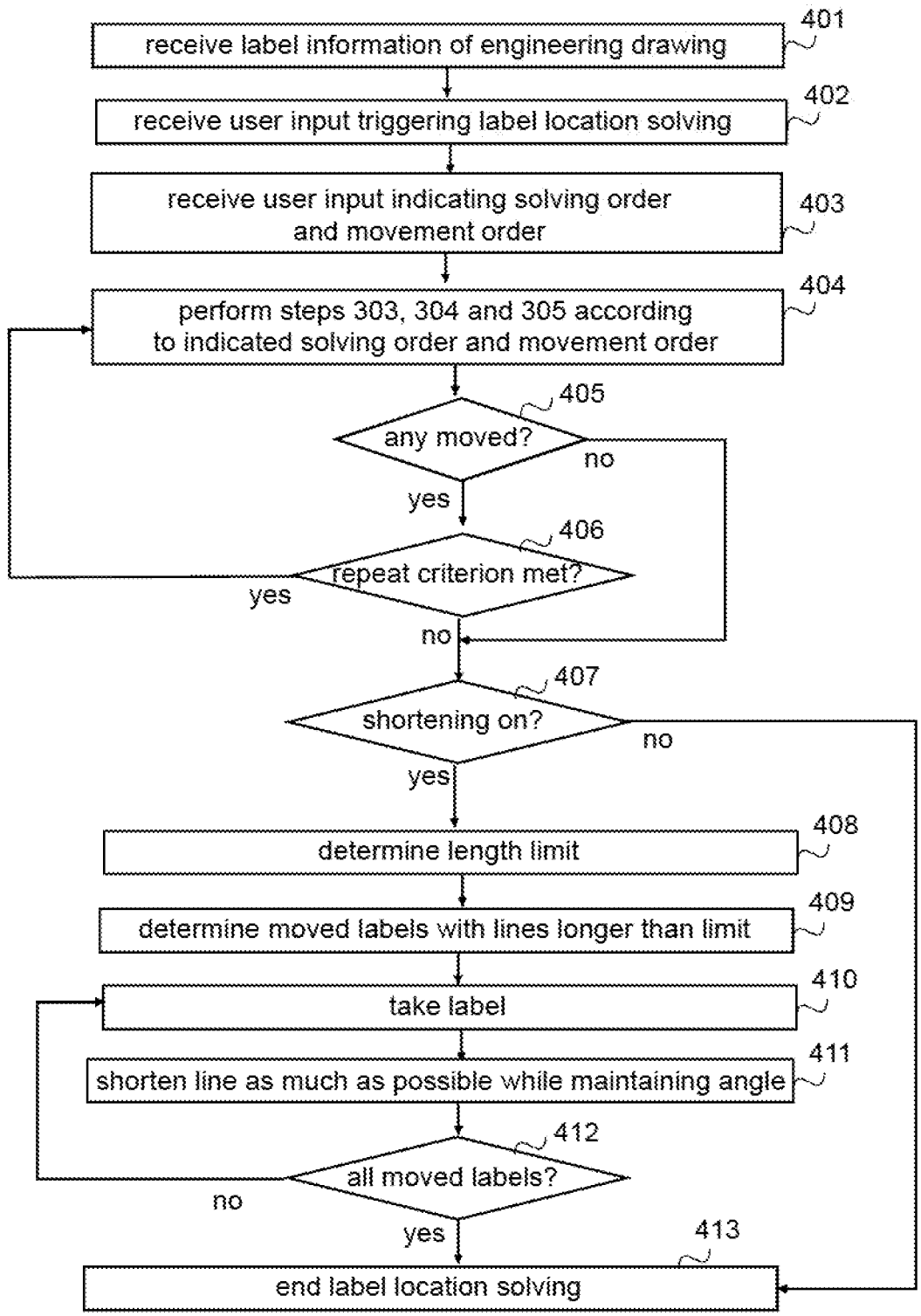

FIG. 4 is a flow chart illustrating another example of a functionality of an apparatus, or more precisely a label location solving unit, according to another implementation. In the illustrated example, a label location fine-tuning process may also comprise a process that tries to shorten lines. Shortening a line provides further clarity: the closer to the object the frame part is, detecting what label belongs to what object becomes easier. That in turn minimizes reading errors in a manufacturing process, for example.

Referring to FIG. 4, steps 401 and 402 correspond to steps 301 and 302 and they are not repeated in vain here. However in the example of FIG. 4, no predetermined order of sub-processes and no predetermined order of movement direction are used but a user input indicating a solving order, i.e. the processing order of the sub-processes, and a user input indicating movement order are received in step 403. The user may input the processing order or indicate that a default solving order is used. The user may input the movement direction or indicate that a default movement direction is used. Depending on an implementation, the same movement direction may be used for frame-frame and frame-line solving processes and for line-line process if it uses movement direction, or separate movement direction for one or more of the solving processes may be given. Then in step 404 the sub-processes are performed, as described above in steps 303, 304 and 305, according to the indicated solving order. Then the checking, if any label was moved, is performed in step 405, corresponding to step 306, and the checking, whether the repeat criterion is met, is performed in step 406, corresponding to step 307.

However, in the example of FIG. 4, if no label was moved (step 405: no), or if the repeat criterion is not met (step 406: no), it is checked in step 407, whether or not a sub-process shortening lines of moved labels is on (enabled). The shortening may be on as a default value, and the user may turn it off, when the user is inputting the processing order of the other sub-processes, for example.

If the shortening is on (step 407: yes), a length limit for the lines is determined in step 408. The length limit may be an average or a median of lengths of label lines or a certain portion, like one third, of the longest label line, for example. Then labels that were moved in step 404 and whose lines are longer than the length limit are determined in step 409. Such a label is taken in step 410 and its line is shortened in step 411 as much as possible so that its frame will not touch another frame or line, towards its original point while maintaining the angle of the line. Thanks to maintaining the angle it is ensured that the line will not touch another line or frame. It should be appreciated that it may be that there is no possibility to shorten the line.

When the line cannot be shortened any more, it is checked in step 412, whether or not all labels that were moved and has line longer than the limit have undergone the shortening. If not (step 412: no), the process returns to step 410 to take the next label.

If all labels determined in step 409 have undergone the shortening (step 412: yes), the label location solving is ended in step 413.

If the shortening is off (step 407), the label location solving is ended in step 413.

Figure 5:
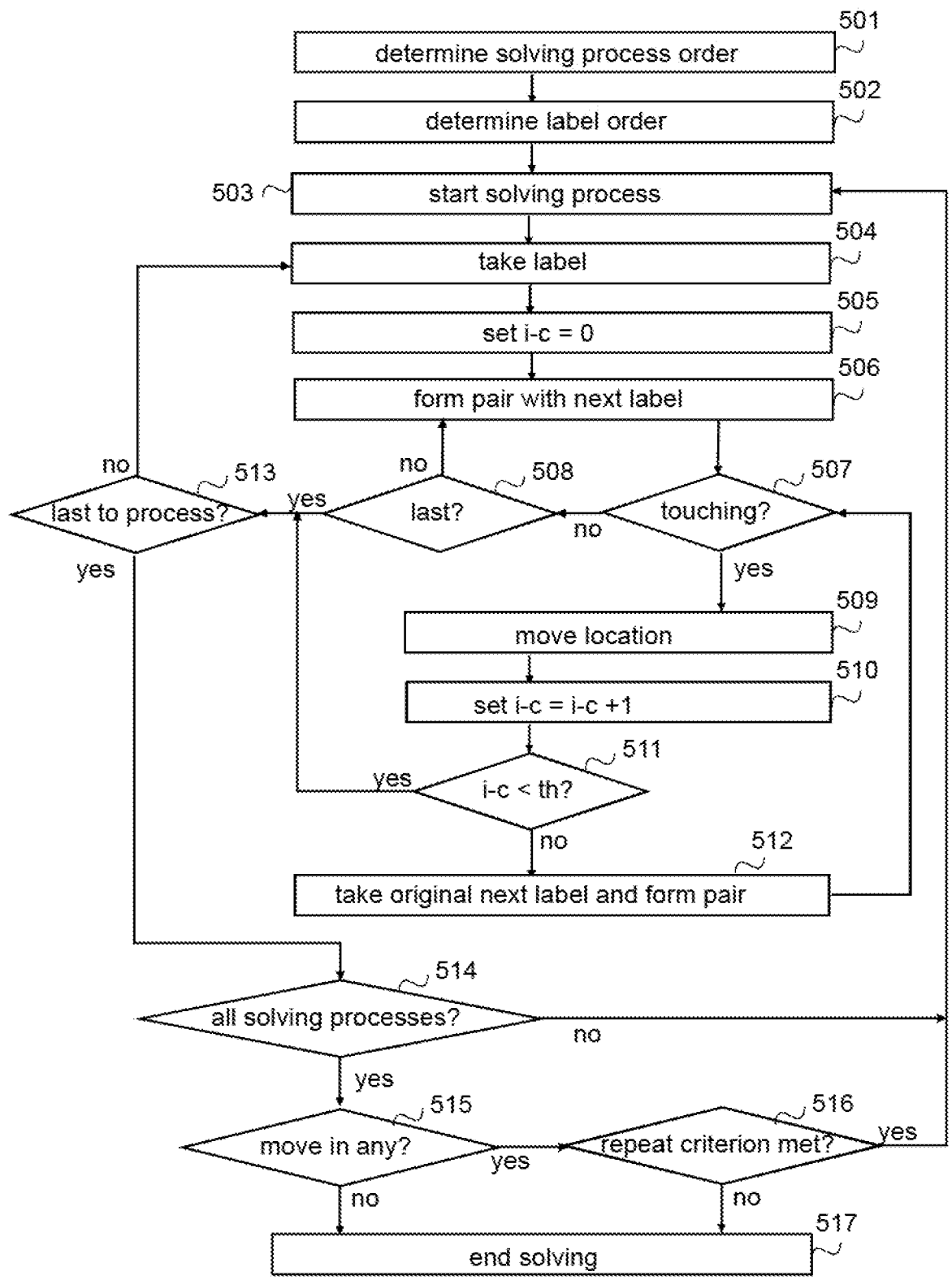

FIG. 5 illustrates an example of the label location solving process, i.e. the fine-tuning process of label locations, that may be implemented by the line-line solving unit and/or by the frame-frame solving unit and/or by the frame-line solving unit. In the illustrated example, an internal counter is used to determine whether a repetition criterion is met within a sub-process, whereas another criterion is used for the whole process, without limiting the example to such repetition criteria.

In the example, the solving process order, i.e. the order in which the sub-processes are performed, is determined in step 501. Then the order of labels in the engineering drawing is determined in step 502. The order may be the creation order, or an order in which the labels are in the engineering drawing, starting from left, for example. It should be appreciated that the order may be determined using any principles. Still a further possibility includes that the order, or at least part of the order, of the labels is inputted by the user. By allowing the user to input the order a possibility to prioritize the labels whose overlap situations at least should be solved, is provided.

Then a solving process (sub-process) is started in step 503 according to the order, and a label is taken in step 504 according to the label order determined in step 502, and the value of the internal counter i-c is set in step 505 to zero. Then a pair is formed with the label and a next label in step 506, and it is checked in step 507, whether or not the labels are touching. Depending on the sub-process it is checked whether lines are touching, frames are touching or a frame is touching a line. If not (step 507: no), it is checked in step 508, whether the label was last in the order. If not (step 508: no), its next label is taken in step 506 to form a pair with the label taken in step 504.

If the labels are touching (step 507: yes), labels locations are moved in step 509 so that they are not touching each other. Examples of possible ways of movements are described with FIGS. 6 to 8. The internal counter value i-c is incremented in step 510 by adding one to the counter value i-c, and then it is checked in step 511 whether or not the counter value i-c is smaller than a threshold (th). If not (step 511: no), the repeating criterion is met, and in step 512 a label that is originally next to the label taken in step 504, is taken and paired with the label under process, since the movement in step 509 may have caused that labels that before movement were not touching each other are after the movement touching each other. Then the process continues to step 507 to check, whether the labels are touching.

If the counter value i-c is smaller than the threshold (step 511: yes), or if the label paired was the last one (step 508: yes), it is checked in step 513, whether the label taken in step 504 was the last to be processed, i.e. the third last in the order. If not (step 513: no), the process proceeds to step 504 to take the next label in the order to be processed.

If there are not any more labels that can be paired with next label (step 513: yes), it is checked in step 514, whether or not all solving processes (sub-processes) have been performed. If not (step 514: no), the process proceeds to step 503 to start the next solving process according to the order determined in step 501.

If all solving processes have been performed (step 514: yes), it is checked in step 515, whether any label was moved in any of the solving processes, i.e. when the solving processes (sub-processes) were performed. A movement in a later solving process may create a touching situation in a previous solving process and this check ensures that the problems will be processed. For example, if the frame-frame solving process is performed after the line-line solving process, a movement caused by touching frames may cause some label lines to touch each other.

If one or more labels were moved (step 514: yes), it is checked in step 516 whether a repeat criterion for label location solving is met. By performing this checking it is ensured that the process ends at some point even though there may be labels with lines touching each other, and/or frames touching frames and/or frames touching lines of other labels. If the repeat criterion is met (step 516: yes), the process returns to step 503 to start a solving process that is first and the order and the solving processes (sub-processes) are repeated in the same order they were repeated previously.

If no label was moved (step 515: no), or if the repeat criterion is not met (step 516: no), the label location solving is ended in step 517 and the locations of labels are stored to the engineering drawing.

Figure 6:
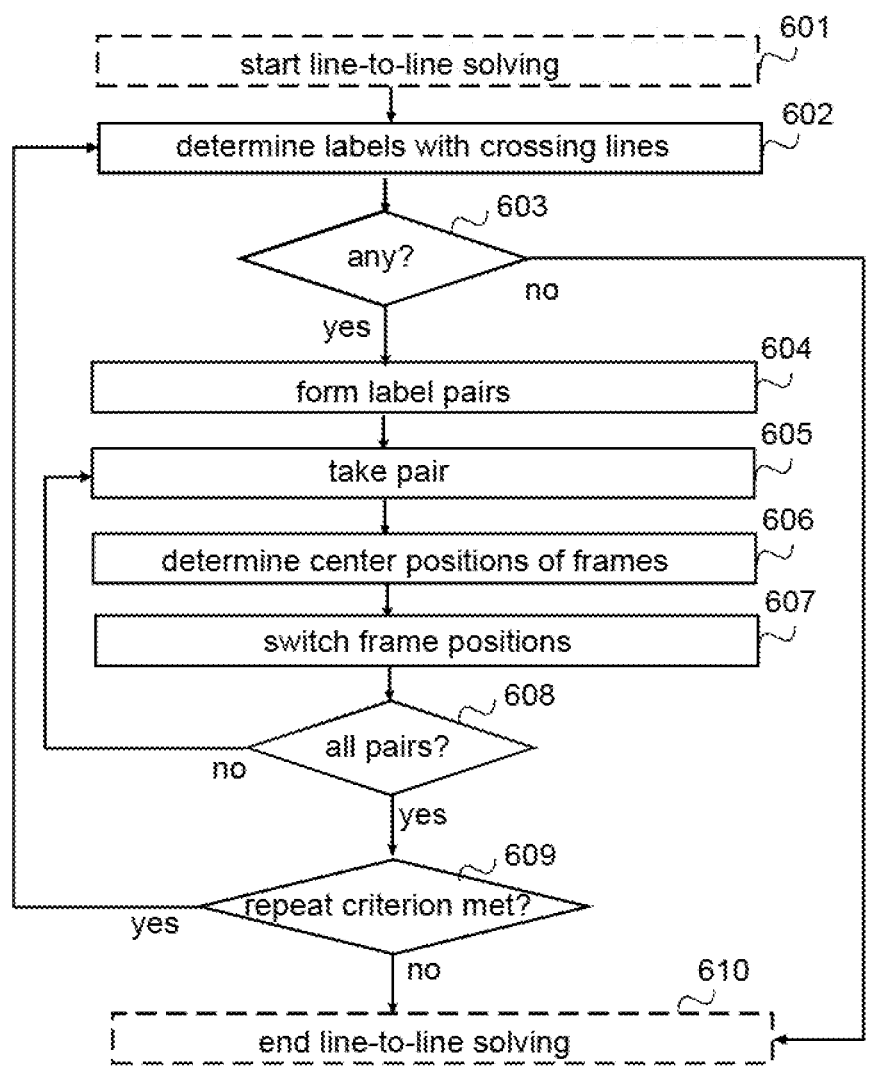

FIG. 6 is a flow chart illustrating an example of functionality how to solve line-line situations in which lines of labels in an engineering drawing are crossing each other. The functionality may be performed by the line-line solving unit, or by any corresponding unit. In the example retrieving the engineering drawing and its pre-existing label definitions, and storing the updated label definitions is not shown separately for the sake of clarity. It should be appreciated that the pre-existing label definitions include label definition updated by any solving process previously performed.

Referring to FIG. 6, when the line-line solving process is started in step 601, the definitions of the engineering drawing are searched for to determine in step 602 each label whose line is crossing at least one line of another label. The determining may be performed by using creation order of labels. Another ordering may be according to the starting points location determined by the coordinates.

If any such labels are found (step 603: yes), label pairs are formed in step 604. The label pair forming is started using the same order as in step 602. In other words, the first label found in order is taken and if its line is crossing only one line the labels form a label pair. If there is a label line crossing with two or more label lines, then the pair is formed with the one that is higher in the order.

When the one or more pairs have been formed a pair is taken to be processed in step 605, and center positions of frames in both labels is determined in step 606 and the positions of the frames are switched in step 607. Then it is checked in step 608, whether or not all pairs formed in step 604 have been processed. If not (step 608: no), the process continues to step 605 to take a pair to be processed.

If all pairs have been processed (step 608: yes), it is checked in step 609, whether or not a preset repeat criterion is met. The repeat criterion may be a counter value that should not be exceeded, a time that should not be exceeded, or a function value calculated, as will be explained below with FIGS. 9 to 11.

If the repeat criterion is met (step 609: yes), the process proceeds to step 602 to determine labels whose lines are crossing with one or more lines.

If the repeat criterion is not met (step 609: no), the line-line solving process is ended in step 610 regardless of whether there are still crossing lines.

If there are no labels whose lines are crossing each other (step 603: no), the line-line solving process is naturally ended (step 609).

Figure 7:
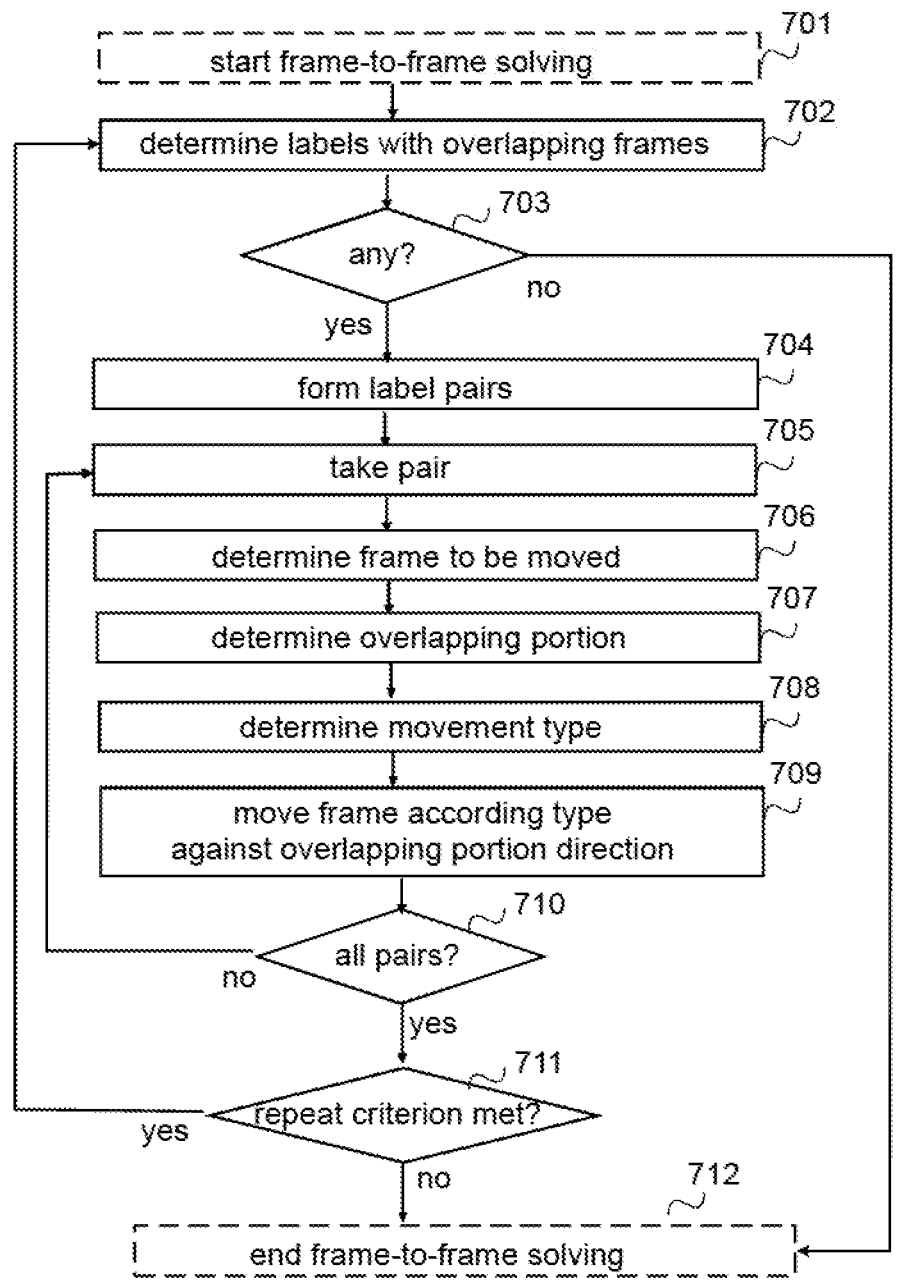

FIG. 7 is a flow chart illustrating an example of functionality how to solve situations in which frames of labels in an engineering drawing are touching each other. The functionality may be performed by the frame-frame solving unit, or by any corresponding unit. In the example retrieving the engineering drawing and its pre-existing label definitions, and storing the updated label definitions is not shown separately for the sake of clarity. It should be appreciated that the pre-existing label definitions include label definition updated by any solving process previously performed.

Referring to FIG. 7, when the frame-frame solving process is started in step 701, the definitions of the engineering drawing are searched for to determine in step 702 each label whose frame is overlapping at least one frame of another label. A frame is overlapping another frame if its outline at least touches outline of another frame. An outline touches another outline if they overlap at least partly, or outlines contact at least partly, or outlines are within a preset distance to each other. The determining may be performed by using creation order of labels, or according to the starting points' location order determined by the coordinates, as described above with FIG. 6.

If any such labels are found (step 703: yes), label pairs are formed in step 704. The label pair forming is started using the same order as in step 702. In other words, the first label found in order is taken and if its frame is overlapping only one frame the labels form a label pair. If there is a label frame overlapping two or more label frames, then the pair is formed with the one that is higher in the order.

When the one or more pairs have been formed a pair is taken to be processed in step 705, it is determined in step 706 which one of the two frames is to be moved. For example, if one of the frames has been moved in a preceding round of this solving process, the other is selected to be moved. Otherwise the order used in step 704 may be used to determine which one is to be moved. For example, the frame with a lower order may be determined to be the one to be moved. Then the overlapping portion is determined in step 707. In other words, it is determined which part of the frame to be moved is overlapping with the other frame. That information is used in step 708 to determine movement type amongst types including vertical movement, horizontal movement and a combined movement. At the simplest in the step a default or user inputted movement type is taken to be used, but as described above, determining may include calculating which one moves the frame the least. If the movement is a predetermined movement, this step may be omitted. The combined movement moves the frame both horizontally and vertically, according to a predefined angle, such as 45 degrees. In the combined movement, the angle may be calculated based on the overlapping portion, for example. When the movement type has been determined, the frame is moved in step 709 according to the movement type against the direction indicated by the overlapping portion until it is not any more touching the frame that remains in its location. If the movement type is vertical and the overlapping portion is in the upper part of the frame to be moved, the frame is moved downwards, and vice versa. If the movement type is horizontal and the overlapping portion is a right side of the frame to be moved, the frame is moved to the left, and vice versa. If the movement type is a combined, and the overlapping portion is in the right side in the upper part, the frame is moved to the left and downwards, for example.

Then it is checked in step 710, whether or not all pairs formed in step 704 have been processed. If not (step 710: no), the process continues to step 705 to take a pair to be processed.

If all pairs have been processed (step 710: yes), it is checked in step 711, whether or not a preset repeat criterion is met. The preset criterion may be different than the one used with the line-line solving, or it may be the same. In other words, the repeat criterion may be a counter value that should not be exceeded, a time that should not be exceeded, or a function value calculated, as will be explained below with FIGS. 9 to 11.

If the repeat criterion is met (step 711: yes), the process proceeds to step 702 to determine labels whose frames are crossing with one or more frames of other labels.

If the repeat criterion is not met (step 711: no), the frame-frame solving process is ended in step 712 regardless of whether there are still overlapping frames.

If there are no overlapping frames (step 703: no), the frame-frame solving process is naturally ended (step 712).

Figure 8:
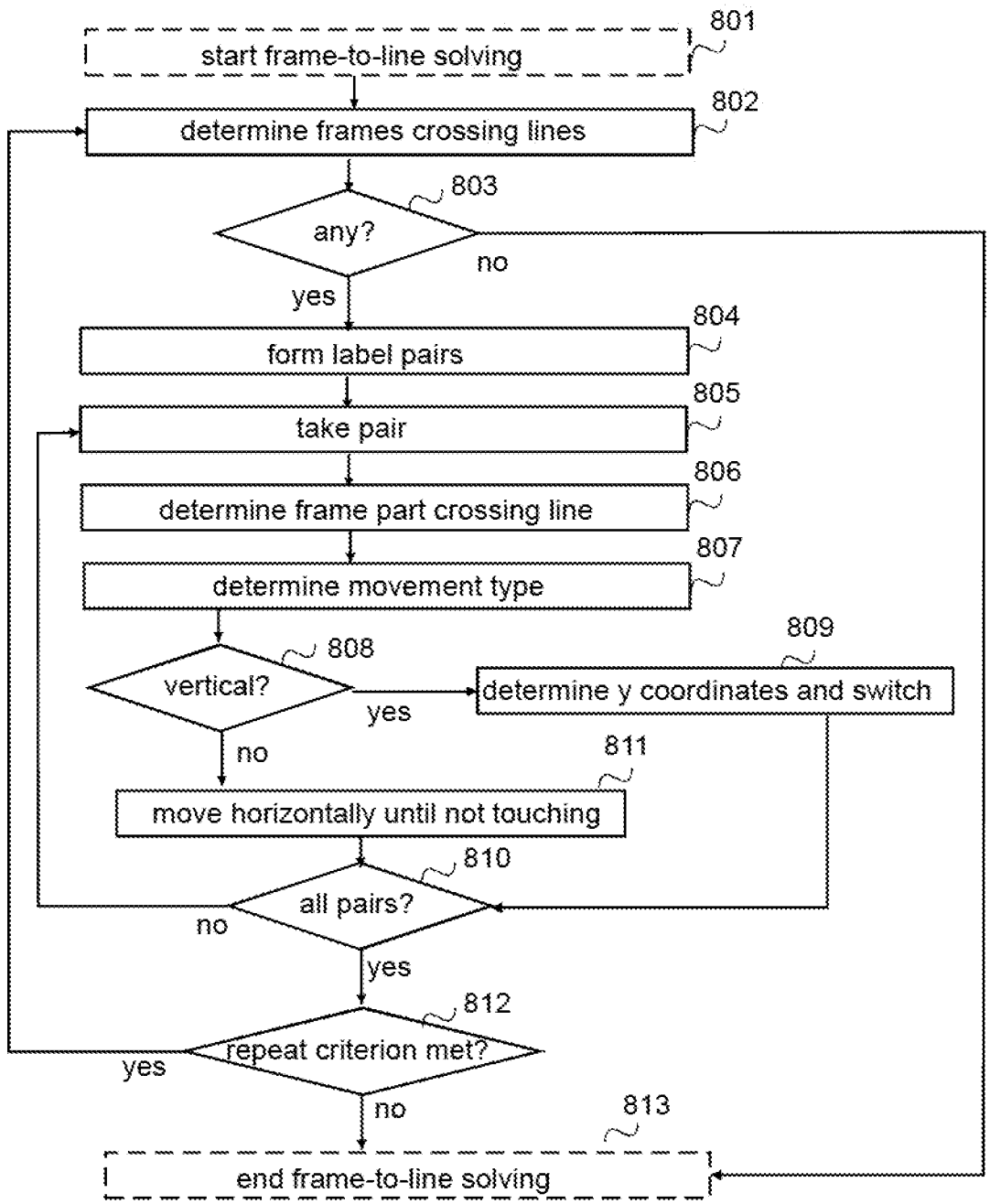

FIG. 8 is a flow chart illustrating an example of functionality how to solve situations in which frames of labels in an engineering drawing are crossing lines of labels. The functionality may be performed by the frame-line solving unit, or by any corresponding unit. In the example retrieving the engineering drawing and its pre-existing label definitions, and storing the updated label definitions is not shown separately for the sake of clarity. It should be appreciated that the pre-existing label definitions include label definition updated by any solving process previously performed.

Referring to FIG. 8, when the frame-line solving process is started in step 801, the definitions of the engineering drawing are searched for to determine in step 802 each label whose frame is crossing at least one line of another label. A frame is crossing a line if its outline at least touches a line. An outline touches a line if they overlap at least partly, or outline and the line contact at least partly, or outline and the line are within a preset distance to each other. The determining may be performed by using creation order of labels, or according to the starting points location order determined by the coordinates, as described above with FIG. 6.

If any such labels are found (step 803: yes), label pairs are formed in step 804. The label pair forming is started using the same order as in step 802. In other words, the first label found in order is taken and if its frame is crossing only one line, the labels form a label pair. If there is a label frame crossing two or more lines, then the pair is formed with the one that is higher in the order.

When the one or more pairs have been formed a pair is taken to be processed in step 805, the overlapping portion is determined in step 806. In other words, it is determined which part of the frame is crossing the line. That information is used in step 807 to determine movement type amongst types including vertical movement and horizontal movement. In the illustrated example, if the predetermined or default movement is a combined movement, it is determined, which one of the vertical movement and the horizontal movement moves less the frame and that one is selected. It should be appreciated that in another embodiment it is possible to try the combined movement. However, by using either the vertical or the horizontal movement the frames are most probably kept nearer the objects.

If the movement type is vertical (step 808: yes), y coordinates of the frames are determined and switched in step 809. Then it is checked in step 810, whether or not all pairs formed in step 804 have been processed. If not (step 810: no), the process continues to step 805 to take a pair to be processed.

If the movement type is horizontal (step 808: no), the frame is moved in step 811 to the left or to the right so that it does not any more touch the line. Alternatively, the frame of the label of the line may be moved so that the line does not anymore touch the frame the line was paired with. Then the process proceeds to step 810 to check, whether or not all pairs formed in step 804 have been processed.

If all pairs have been processed (step 810: yes), it is checked in step 812, whether or not a preset repeat criterion is met. The preset criterion may be different than the one used with the line-line solving, and/or with the frame-frame solving, or it may be the same. In other words, the repeat criterion may be a counter value that should not be exceeded, a time that should not be exceeded, or a function value calculated, as will be explained below with FIGS. 9 to 11.

If the repeat criterion is met (step 812: yes), the process proceeds to step 802 to determine labels whose frames are crossing with one or more frames of other labels.

If the repeat criterion is not met (step 812: no), the frame-to-line solving process is ended in step 813 regardless of whether there are still frames crossing lines.

If there are no frames crossing lines (step 803: no), the frame-to-line solving process is naturally ended (step 813).

Figure 9:
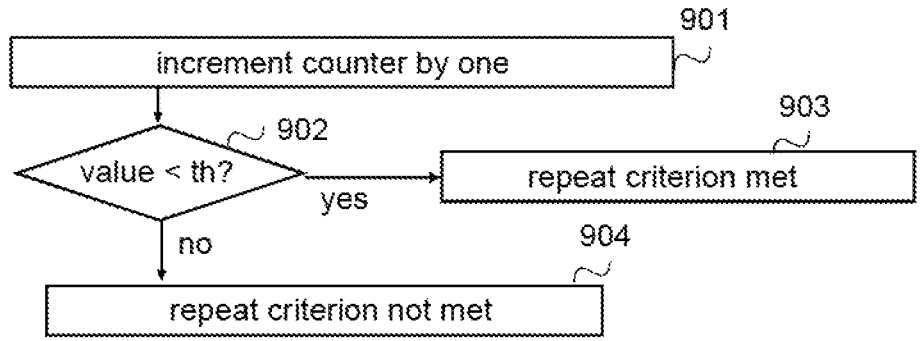
Figure 10:
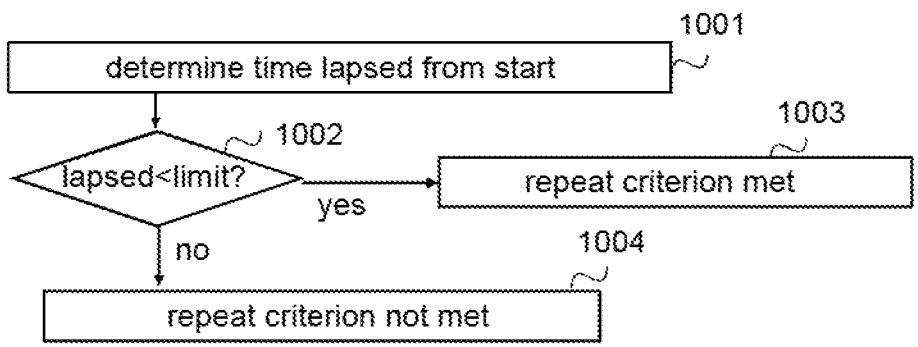
Figure 11:
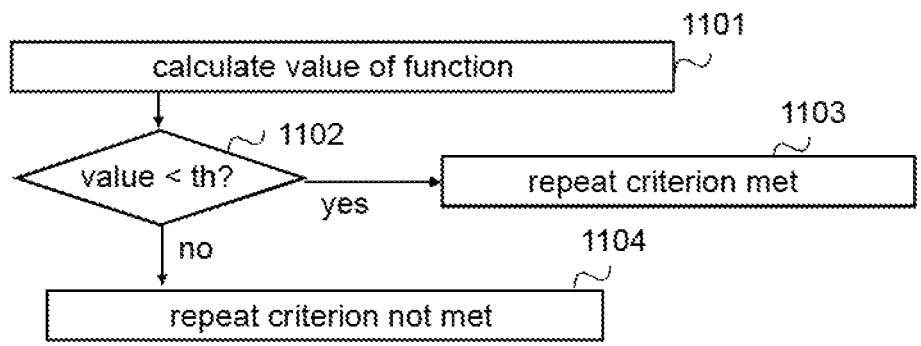

FIGS. 9 to 11 illustrate different examples to determine whether or not repeat criterion is met. In the illustrated examples one criterion is used, for the sake of clarity.

A counter calculating the number of iteration rounds, i.e. the number how many times a process, or sub-process, or certain steps is performed/repeated may be used to determine whether or not a repeat criterion is met. Such a process is disclosed in FIG. 9.

Referring to FIG. 9, a counter is incremented by one in step 901. The counter may be incremented when an iteration round is started or when it is ended. When it is time to determine, whether or not repeat criterion is met, the counter value is compared to a threshold (th). The threshold may be a preset parameter, stored to the memory for the process in question. The threshold may also be a result of a predetermined function, stored to the memory for the process in question. For example, the threshold may depend on the process and processing power of the apparatus performing the process, or processing power allocated to the process.

In the illustrated example of FIG. 9, it is checked in step 902 whether the counter value is smaller than the threshold, and if it is (step 902: yes), the repeat criterion is met (step 903), and the process may be repeated. However, if the counter value is not smaller than the threshold (step 902: no), the repeat criterion is not met (step 904), and the process is not repeated. Further, the counter value may be reset to zero in step 904.

A time used may be used to determine whether or not a repeat criterion is met. Such a process is disclosed in FIG. 10.

Referring to FIG. 10, time lapsed from the start of the process is determined in step 1001. The time lapsed may be determined when an iteration round ended, or when it is time to start the next iteration round (time to determine, whether or not repeat criterion is met). To determine the lapsed time, the time when the process started will be maintained as temporary information. The lapsed time is then compared to a limit (threshold). The limit, or time limit, may be a preset parameter, stored to the memory for the process in question. The time limit may also be a result of a predetermined function, stored to the memory for the process in question. For example, the time limit may depend on the process and processing power of the apparatus performing the process, or processing power allocated to the process.

In the illustrated example of FIG. 10, it is checked in step 1002 whether the time lapsed is smaller than the time limit, and if it is (step 1002: yes), the repeat criterion is met (step 1003), and the process may be repeated. However, if the time lapsed is not smaller than the time limit (step 1002: no), the repeat criterion is not met (step 1004), and the process is not repeated.

It is also possible to define a function whose result, i.e. value, may be used to determine whether or not a repetition criterion is met. For example, the function may use as an input the number of iteration rounds, that may be calculated as described with FIG. 9, the number of moved labels in the previous iteration round (repeating round), and/or the number of moved labels in X previous iteration rounds. For the step 307 in FIG. 3, step 406 in FIG. 4, and step 516 in FIG. 5, the input may be more specific. For example, the input may comprise the number of iteration rounds sub-process specifically and/or the number of labels moved in each sub-process. Another example includes the number of moved labels during line-line solving in N previous iteration rounds, the number of moved labels during frame-frame solving in M previous iteration rounds and the number of moved labels during frame-line solving in L previous iteration rounds.

Referring to FIG. 11, a value of a function to be used is calculated in step 1101. Depending on the input, the value may be calculated when an iteration round is started or when it is ended. When it is time to determine, whether or not repeat criterion is met, the value is compared to a threshold (th). The threshold may be a pre-set parameter, stored to the memory for the process in question. The threshold may also be a result of a predetermined function, stored to the memory for the process in question. For example, the threshold may depend on the process and processing power of the apparatus performing the process, or processing power allocated to the process.

In the illustrated example of FIG. 11, it is checked in step 1102 whether the counter value is smaller than the threshold, and if it is (step 1102: yes), the repeat criterion is met (step 1103), and the process may be repeated. However, if the counter value is not smaller than the threshold (step 1102: no), the repeat criterion is not met (step 1104), and the process is not repeated. Further, the counter value may be reset to zero in step 1104.

Figure 12:
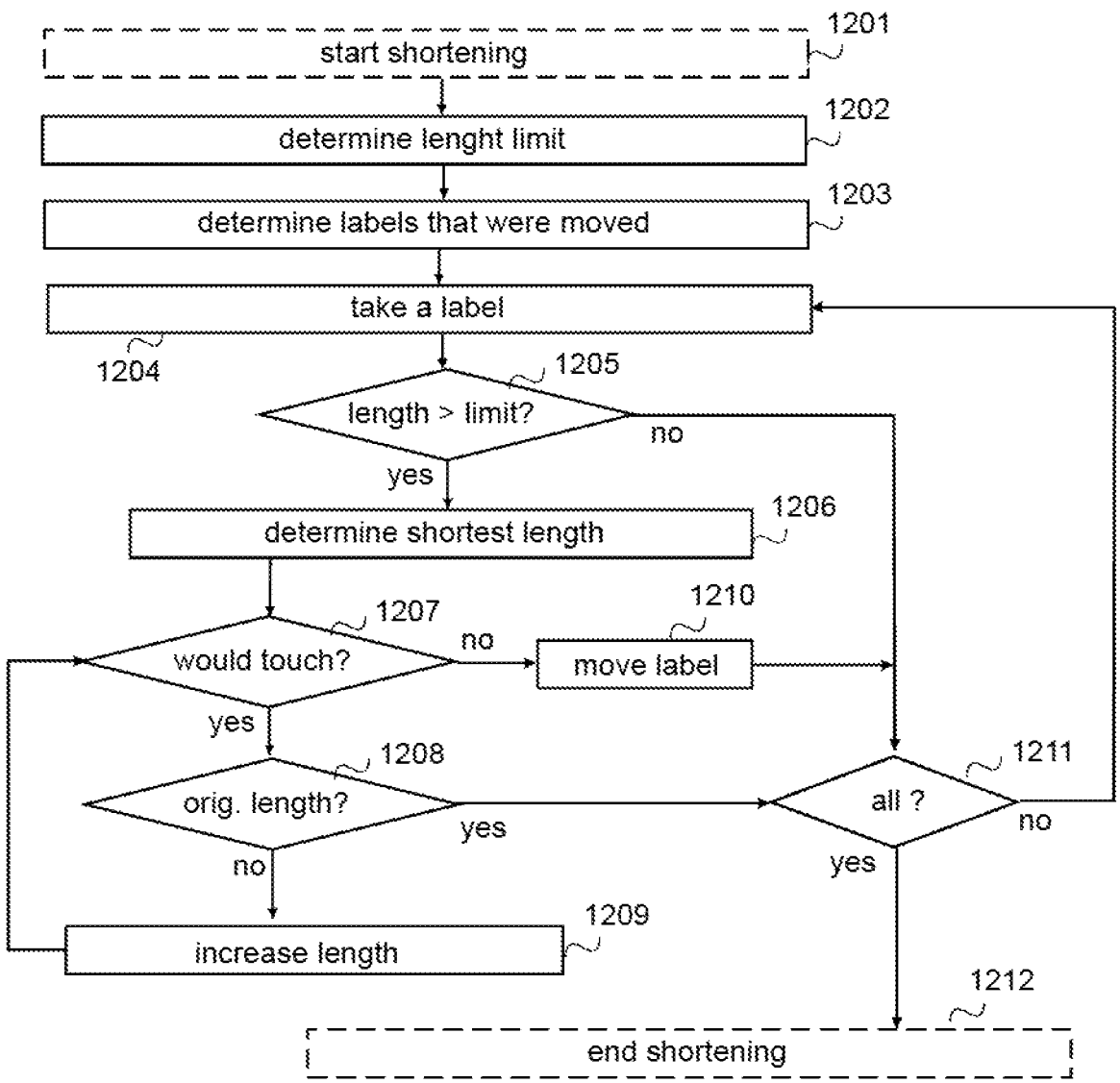

FIG. 12 is a flow chart illustrating an example of functionality of a label line shortening process. The functionality may be performed by the line length minimizing unit, or any corresponding unit. The illustrated process is performed when the label relocation process has ended. However, in an implementation the process may be performed to label definitions retrieved with the engineering drawing definitions. It is irrelevant for the process how the pre-existing label definitions have been created. In the example retrieving the pre-existing label definitions, and storing the updated label definitions is not shown separately for the sake of clarity. Further, in the illustrated example the used approach is to start with the shortest estimated label line length and increase it gradually, if needed. It is a straightforward process for one skilled in the art to implement the example with other kind of approaches, such as starting using the current length and shortening it gradually until it cannot be shortened any more, or starting from middle of current line (or any other point), and determining whether to gradually shorten more or lengthen more based whether or not the frame will touch at least one label in the start position.

Referring to FIG. 12, when the shortening process is started in step 1201, a length limit is determined in step 1202. The length limit may be determined using a function. For example, an average length of lines of labels in the processed engineering drawing, or in the selection for the processing, may be calculated and then multiplied by a preset parameter value. For example, the length limit may be half of the average length.

In the illustrated example those labels that were moved in the label relocation process are determined in step 1203. Naturally the process may be performed to all labels.

Once the labels have been determined, a label amongst the determined labels is taken in step 1204 to be processed, and the length of the line of the label is compared with the length limit in step 1205. If the length is longer than the limit (step 1205: yes), a shortest length for the line is determined in step 1206. The shortest length may be set to be the length limit. Other examples include that the length of the line is divided by a preset parameter value, for example by five, or multiplied by a preset parameter value, for example 0.2, and the result is the shortest length. Naturally any other function may be used. Further, the parameter value(s) used in the function may be received as a user input. Still a further example is that the shortest length is the longer of the length limit and the result of the function.

When the shortest length has been determined, it is checked in step 1207, assuming that the length of line would be the determined length from the original point without changing the angle, whether the frame of the label would touch at least one other label in the assumed location.

If it would touch (step 1207: yes), it is checked in step 1208 whether the line length is the original length, i.e. the line length of the label in its current location. This checking takes into account that it may be that the label in its position, when the shortening was started, was already touching another label, and the checking ensures that the label is not moved to have longer line than before the shortening process.

If the line length is not the original length (step 1208: no), the line length is increased in step 1209. There are no limitations how to determine how much the line length is increased. The line length may be increased by adding the shortest length, or the output value of a function used in step 1206, or a preset parameter value, to the line length. The line length may be increased by dividing the original line length with a counter value reduced by one each time this step is performed, or by multiplying the original line length with a counter value increased gradually each time this step is performed. The counter value could be the preset parameter used in step 1206. Then the process proceeds to step 1207 to determine, using the longer (increased) line length, whether the frame of the label would touch at least one other label.

If with the assumed line length the frame would not touch another label (step 1207: no), the label is moved in step 1210 to the corresponding location, and then the process proceeds to step 1211 to check, whether all labels determined in step 1203 have undergone the process. If not (step 1211: no), the process continues to step 1204 to take a label to be processed. If all labels have been processed (step 1211: yes), the shortening is ended in step 121.

If the line length of the label is not longer than the length limit (step 1205: no) or if the assumed length is the original length (step 1208: yes), it is checked in step 1211, whether all labels determined in step 1203 have undergone the process.

In other implementations, only labels that are not touching another label undergo the shortening process, in which case there is no need to perform the check of step 1208. In an implementation, in step 1203 those labels that were moved and are not touching another label are determined. In another implementation, when a label is taken, either before step 1205, or after step 1205 if the length is longer than the length limit, it is checked, whether the label touches another label in its original position, and if it does, the process continues therefrom to step 1211 to check, whether all determined labels are processed.

The steps and related functions described above in FIGS. 3 to 12 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

As is evident from the above examples, different label location automatic fine-tuning processes, i.e. positioning (processes), and corresponding sub-processes that may be freely combined, are disclosed. Thanks to any of the disclosed label location automatic fine-tuning processes, the number of labels touching one or more other labels may be minimized without complicated calculations and without artificial intelligence while the lengths of the lines of the labels are kept so short as it is possible—even without performing the additional shortening process. In sum, processes improving placement of labels are disclosed.

The techniques described herein may be implemented by various means so that an apparatus implementing one or more functions/operations described above with an embodiment/example, for example by means of any of FIGS. 1A to 12 and any combination thereof, comprises not only prior art means, but also means for implementing the one or more functions/operations of a corresponding functionality described with an embodiment, for example by means of any of FIGS. 1A to 12 and any combination thereof, and it may comprise separate means for each separate function/operation, or means may be configured to perform two or more functions/operations. For example, one or more of the means and/or a label location solving unit, or any of its sub-units including a line-line solving unit and/or a frame-frame solving unit and/or a frame-line solving unit and/or a line length minimizing unit, or any corresponding unit, for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 13:
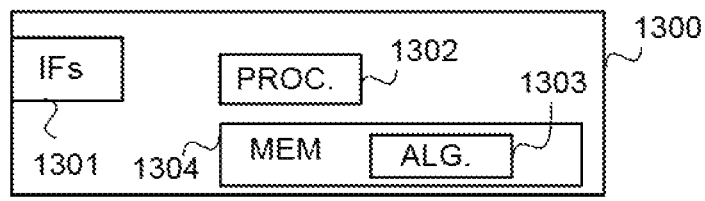
FIG. 13 is a schematic block diagram of an exemplary apparatus.

FIG. 13 is a simplified block diagram illustrating some units for an apparatus 1300 comprising the label location solving unit, or any of its sub-units including the line-line solving unit and/or the frame-frame solving unit and/or the frame-line solving unit and/or the line length minimizing unit, or any corresponding unit, or configured otherwise to perform at least some functionality described above, for example by means of any of FIGS. 1A to 12 and any combination thereof, or some of the functionalities if functionalities are distributed in the future. In the illustrated example, the apparatus comprises one or more interface (IF) entities 1301, such as one or more user interfaces, one or more processing entities 1302 connected to various interface entities 1301 and to one or more memories 1304.

The one or more interface entities 1301 are entities for receiving and transmit-ting information, such as communication interfaces comprising hardware and/or software for realizing communication connectivity according to one or more communication protocols, or for realizing data storing and fetching, or for providing user interaction via one or more user interfaces. The one or more user interfaces may be any kind of a user interface, for example a screen, a keypad, or an integrated display device or external display device.

A processing entity 1302 is capable to perform calculations and configured to implement at least the label location solving unit, or any of its sub-units including the line-line solving unit and/or the frame-frame solving unit and/or the frame-line solving unit and/or the line length minimizing unit, described herein, or at least part of functionalities/operations described above, for example by means of any of FIGS. 1A to 12 and any combination thereof, as a corresponding unit or a sub-unit if distributed scenario is implemented, with corresponding algorithms 1303 stored in the memory 1304. The entity 1302 may include a processor, controller, control unit, micro-controller, unit, module, etc. suitable for carrying out embodiments or operations described above, for example by means of any of FIGS. 1A to 12 and any combination thereof. Generally the processor is a central processing unit, but the processor may be an additional operation processor.

A memory 1304 is usable for storing a computer program code required for the label location solving unit, or any of its sub-units including the line-line solving unit and/or the frame-frame solving unit and/or the frame-line solving unit and/or the line length minimizing unit, or a corresponding unit or sub-unit, or for one or more functionalities/operations described above, for example by means of any of FIGS. 1A to 12 and any combination thereof, i.e. the algorithms for implementing the functionality/operations described above by means of any of FIGS. 1A to 12 and any combination thereof. The memory 1304 may also be usable for storing other possible information, like the engineering drawings and temporarily stored information.

As a summary, each or some or one of the units/sub-units and/or algorithms for functions/operations described herein, for example by means of means of any of FIGS. 1A to 12 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. Each or some or one of the units/sub-units and/or algorithms for functions/operations described above, for example by means of means of any of FIGS. 1A to 12 and any combination thereof, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the label location solving unit, or any of its sub-units including the line-line solving unit and/or the frame-frame solving unit and/or the frame-line solving unit and/or the line length minimizing unit, or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of means of any of FIGS. 1A to 12 and any combination thereof, may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

What is claimed is:

1. A computer implemented method comprising: processing, by a computing device, at least one engineering drawing that comprises a plurality of objects representing items for manufacture and a plurality of labels for conveying information on at least some of the items, a label in an engineering drawing comprising a frame and a line between the frame and an originating point on a specific location on an object whose information is outputted in the frame, the frame comprising an outline and a location within the engineering drawing;

triggering, by the computing device, in response to a user input indicating an automatic label location fine-tuning process for an engineering drawing, the automatic label location fine-tuning process comprising:

determining, by the computing device, a solving process order, wherein the solving process order is an order in which processes are performed, the processes comprising a line-line solving process, a frame-frame solving process, and a frame-line solving process;

determining, by the computing device, a label order, wherein the label order is an order in which the plurality of labels are processed in each of the processes;

performing, by the computing device, a first iteration of the automatic label location fine-tuning process by performing the processes according to the solving process order and the label order; repeating, by the computing device, one or more additional iterations of the automatic label fine-tuning process by performing the processes according to the solving process order and the label order as long as during performing the processes one or more frames have been moved to another location and a first repeat criterion is met;

wherein the line-line solving process comprises determining label pairs whose lines are touching each other and moving their frame locations so that the lines are not any more touching each other, and repeating the line-line solving process as long as there are lines touching each other and a second repeat criterion is met;

the frame-frame solving process comprises determining label pairs whose outlines are touching each other and moving one of the frames in the pair to a location in which the outlines are not touching, and repeating the frame-frame solving process as long as there are outlines touching each other and a third repeat criterion is met; and the frame-line solving process comprises determining label pairs comprising a first label and a second label, an outline of the first label touching a line of the second label and moving a frame of the first label to a location in which its outline does not touch the line of the second label, and repeating the frame-line solving process as long as such pairs exist in the engineering drawing and a fourth repeat criterion is met.

2. The computer implemented method of claim 1, further comprising: performing, by the computing device, after the repeating of the processes ends, a shortening process comprising: determining labels for the shortening process; determining a limit for a line length; and repeating to the labels determined for the shortening process the following steps: comparing a length of a line of a label with the limit; if the length is longer than the limit, shortening the line, while maintaining the angle between the outline and frame the same, to a length in which an outline of a correspondingly moved frame will not touch a line or an outline of another label in the engineering drawing; and if the length is not longer than the limit, leaving the frame to its location.

3. The computer implemented method of claim 2, wherein the line is shortened to a shortest possible length that is longer than or equal to the limit.

4. The computer implemented method of claim 2, further comprising performing the shortening of a label line in a step-wise way process comprising: shortening the line to the limit and moving the frame to a corresponding new location; determining whether the frame in the new location touches a line or an outline of another label; if it does not touch, leaving the frame to the new location and ending the step wise way process for the label; if it touches, comparing the current length of the line with the length of the line when the process was started; if the lengths are the same, ending the step-wise way process for the label without shortening the line; and if the current length is smaller, increasing the length of the line by a predetermined amount and moving the frame to a corresponding new location, and then returning to the determining step.

5. The computer implemented method of claim 2, further comprising: receiving user input indicating whether to enable or decline the shortening process; performing the shortening process in response to the user input enabling the shortening process; and not performing the shortening process in response to the user input declining the shortening process.

6. The computer implemented method of claim 1, wherein the line-line solving process comprises determining center locations of frames and the frames are moved by switching their locations.

7. The computer implemented method of claim 1, wherein the frame-frame solving process comprises: determining movement type amongst a vertical, a horizontal and a combined movement type; determining overlapping portion; determining which one of the frames is to be moved; and moving the frame using the determined movement type to a direction that is against the overlapping portion until the frame is not any more overlapping with the frame that is not moved.

8. The computer implemented method of claim 7, wherein if one of the frames in the pair was moved in the previous frame-frame repetition round, determining that the other frame is the frame to be moved.

9. The computer implemented method of claim 1, wherein the frame-line solving process comprises: determining whether the movement type is vertical or horizontal; if the movement type is horizontal moving one of the labels either to left or to the right until it is not anymore overlapping with the other label; if the movement type is vertical, determining coordinate values of the frames in the vertical direction and moving the frames by switching the coordinate values.

10. The computer implemented method of claim 1, wherein the solving process order is a predetermined order or an order received as user input.

11. The computer implemented method of claim 1, wherein at least one of the frames comprises a visible borderline within the outline so that the outline covers the same or bigger area than the visible borderline.

12. The computer implemented method of claim 1, wherein the first repeat criterion is a maximum number for repetition or a maximum time for repetition or a value of a function.

13. A non-transitory computer readable medium comprising program instructions for causing, in response to a user input indicating an automatic label location fine-tuning process for an engineering drawing that comprises a plurality of objects representing items for manufacture and a plurality of labels for conveying information on at least some of the items, a label in an engineering drawing comprising a frame and a line between the frame and an originating point on a specific location on an object whose information is outputted in the frame, the frame comprising an outline and a location within the engineering drawing, a computing apparatus to:

determine a solving process order, wherein the solving process order is an order in which processes are performed, the processes comprising a line-line solving process, a frame-frame solving process, and a frame-line solving process;

determine a label order, wherein the label order is an order in which the plurality of labels are processed in each of the processes;

perform a first iteration of the automatic label location fine-tuning process by performing the processes according to the solving process order and the label order;

repeat one or more additional iterations of the automatic label fine-tuning process by performing the line-line solving process, the frame-frame solving process and the frame-line solving process according to the first solving process order and the label order as long as during performing the processes one or more frames have been moved to another location and a first repeat criterion is met;

wherein the line-line solving process comprises repeating determining label pairs whose lines are touching each other and moving their frame locations so that the lines are not any more touching each other as long as there are lines touching each other, and repeating the line-line solving process and a second repeat criterion is met;

the frame-frame solving process comprises repeating determining label pairs whose outlines are touching each other and moving one of the frames in the pair to a location in which the outlines are not touching, and repeating the frame-frame solving process as long as there are outlines touching each other and a third repeat criterion is met; and the frame-line solving process comprises repeating determining label pairs comprising a first label and a second label, an outline of the first label touching a line of the second label and moving a frame of the first label to a location in which its outline does not touch the line of the second label, and repeating the frame-line solving process as long as such pairs exist in the engineering drawing and a fourth repeat criterion is met.

14. The non-transitory computer readable medium of claim 13 having stored thereon further instructions that, when executed by the computing apparatus, cause, after the repeating of the processes ends, the computing apparatus further to perform a shortening process comprising: determining labels for the shortening process; determining a limit for a line length; and repeating to the labels determined for the shortening process the following steps: comparing a length of a line of a label with the limit; if the length is longer than the limit, shortening the line, while maintaining the angle between the outline and frame the same, to a length in which an outline of a correspondingly moved frame will not touch a line or an outline of another label in the engineering drawing; and if the length is not longer than the limit, leaving the frame to its location.

15. The non-transitory computer readable medium of claim 13, wherein the line-line solving process comprises determining center locations of frames and the frames are moved by switching their locations; the frame-frame solving process comprises: determining movement type amongst a vertical, a horizontal and a combined movement type; determining overlapping portion; determining which one of the frames is to be moved; and moving the frame using the determined movement type to a direction that is against the overlapping portion until the frame is not any more overlapping with the frame that is not moved; and the frame-line solving process comprises: determining whether the movement type is vertical or horizontal; when the movement type is horizontal moving one of the labels either to left or to the right until it is not anymore overlapping with the other label; when the movement type is vertical, determining coordinate values of the frames in the vertical direction and moving the frames by switching the coordinate values.

16. An apparatus comprising:
at least one processor; and
at least one memory including computer program code;
the at least one memory and computer program code configured to, with the at least one processor, cause, in response to a user input indicating an automatic label location fine-tuning process for an engineering drawing that comprises a plurality of objects representing items for manufacture and a plurality of labels for conveying information on at least some of the items, a label in an engineering drawing comprising a frame and a line between the frame and an originating point on a specific location on an object whose information is outputted in the frame, the frame comprising an outline and a location within the engineering drawing, the apparatus configured to:
determine a solving process order, wherein the solving process order is an order in which processes are performed, the processes comprising a line-line solving process, a frame-frame solving process, and a frame-line solving process;
determine a label order, wherein the label order is an order in which the plurality of labels are processed in each of the processes;
perform a line line solving process, a frame frame solving process and a frame line solving process according to a first order of the processes a first iteration of the automatic label location fine-tuning process by performing the processes according to the solving process order and the label order; repeat one or more additional iterations of the automatic label fine-tuning process by performing the line-line solving process, the frame-frame solving process and the frame-line solving process according to the first solving process order and the label order as long as during performing the processes one or more frames have been moved to another location and a first repeat criterion is met;
wherein the line-line solving process comprises repeating determining label pairs whose lines are touching each other and moving their frame locations so that the lines are not any more touching each other, and repeating the line-line solving process as long as there are lines touching each other and a second repeat criterion is met;
the frame-frame solving process comprises repeating determining label pairs whose outlines are touching each other and moving one of the frames in the pair to a location in which the outlines are not touching, and repeating the frame-frame solving process as long as there are outlines touching each other and a third repeat criterion is met; and
the frame-line solving process comprises repeating determining label pairs comprising a first label and a second label, an outline of the first label touching a line of the second label and moving a frame of the first label to a location in which its outline does not touch the line of the second label, and repeating the frame-line solving process as long as such pairs exist in the engineering drawing and a fourth repeat criterion is met.

17. The apparatus of claim 16, wherein the at least one memory and the computer program code are further configured to, with the at least one processor, cause the apparatus to perform a shortening process comprising: determining labels for the shortening process; determining a limit for a line length; and repeating to the labels determined for the shortening process following: comparing a length of a line of a label with the limit; if the length is longer than the limit, shortening the line, while maintaining the angle between the outline and frame the same, to a length in which an outline of a correspondingly moved frame will not touch a line or an outline of another label in the engineering drawing; if the length is not longer than the limit, leaving the frame to its location.

18. The apparatus of claim 16, wherein the at least one memory and the computer program code are further configured to, with the at least one processor, cause the apparatus to perform the line-line solving process by determining center locations of frames and by moving the frames by switching their locations; the frame-frame solving process by determining movement type amongst a vertical, a horizontal and a combined movement type; by determining overlapping portion; by determining which one of the frames is to be moved; and by moving the frame using the determined movement type to a direction that is against the overlapping portion until the frame is not any more overlapping with the frame that is not moved; and the frame-line solving process by determining whether the movement type is vertical or horizontal; in response to the movement type being horizontal, by moving one of the labels either to left or to the right until it is not anymore overlapping with the other label; in response to the movement type being vertical, determining coordinate values of the frames in the vertical direction and moving the frames by switching the coordinate values.

\* \* \* \* \*